United States Patent [19]

Wolfe, Jr.

[11] Patent Number: 4,782,110

[45] Date of Patent: * Nov. 1, 1988

[54] THERMOPLASTIC COMPOSITIONS OF CRYSTALLINE POLYOLEFIN, AND ETHYLENE/ALKYL ACRYLATE COPOLYMER ELASTOMER

[75] Inventor: James R. Wolfe, Jr., Wilmington, Del.

[73] Assignee: E. I. Du Pont de Nemours and Company, Wilmington, Del.

[*] Notice: The portion of the term of this patent subsequent to Dec. 1, 2004 has been disclaimed.

[21] Appl. No.: 796,589

[22] Filed: Nov. 7, 1985

[51] Int. Cl.$^4$ .................. C08L 23/04; C08L 23/10; C08L 33/04

[52] U.S. Cl. .................. 524/522; 525/221; 525/227; 525/194

[58] Field of Search ............... 525/221, 194; 524/522

[56] References Cited

U.S. PATENT DOCUMENTS

| | | | |
|---|---|---|---|
| 2,953,541 | 9/1960 | Pecha et al. | 525/227 |
| 3,904,588 | 9/1975 | Greene | 525/382 |
| 4,234,656 | 11/1980 | Amembal et al. | 428/379 |
| 4,275,180 | 6/1981 | Clarke | 525/173 |
| 4,555,546 | 11/1985 | Patel | 525/78 |
| 4,710,544 | 12/1987 | Wolfe, Jr. | 525/194 |

Primary Examiner—Carman J. Seccuro

[57] ABSTRACT

A melt processible multi-phase thermoplastic composition comprising a blend of:

(A) 15–75 parts by weight of a crystalline polyolefin resin comprising polymerized monomer units of ethylene or propylene or mixtures thereof forming the continuous phase of the composition, and (B) 25–80 parts by weight of a crosslinked elastomer of an ethylene/alkyl acrylate copolymer consisting essentially of units derived from ethylene, an alkyl ester of acrylic acid wherein the alkyl group contains 1–6 carbon atoms and a monoalkyl ester of 1,4-butenedioic acid wherein the alkyl group contains 1–6 carbon atoms forming the discontinuous phase of the composition.

16 Claims, No Drawings

THERMOPLASTIC COMPOSITIONS OF CRYSTALLINE POLYOLEFIN, AND ETHYLENE/ALKYL ACRYLATE COPOLYMER ELASTOMER

BACKGROUND OF THE INVENTION

This invention relates to a novel melt processible, multi-phase thermoplastic composition of a crystalline polyolefin resin, a crosslinked elastomeric ethylene/alkyl acrylate copolymer and a method for making such thermoplastic compositions.

Blends of plastics and elastomers are generally not compatible with each other and the resulting compositions have unsatisfactory physical properties. Frequently, the elastomer component of such blend is uncured which results in a composition having high compression set and high oil swell. However, it is advantageous to blend crystalline polymers with certain elastomers in such a manner that they are compatible with each other and result in thermoplastic elastomer compositions that have good elastomeric characteristics and stress-strain properties, e.g., excellent oil swell resistance and tensile strength, adequate percent elongation and compression set resistance. Scrap material of the thermoplastic compositions should be capable of being reground and reprocessed with substantially no significant change in the physical properties of the thermoplastic composition. Further, it is important, especially from an economic standpoint that the thermoplastic compositions are easily processible on both thermoplastic equipment or on conventional rubber processing equipment with little or no modification.

SUMMARY OF THE INVENTION

The present invention is directed to a thermoplastic composition having excellent oil swell resistance and tensile strength, while, at the same time, the compositions have adequate percent elongation, compression set resistance and the scrap material is reusable. More specifically, this invention is directed to a melt processible multi-phase thermoplastic composition comprising a blend of:

(A) 15-75 parts by weight of a crystalline polyolefin resin comprising polymerized monomer units of ethylene or propylene or mixtures thereof forming the continuous phase of the composition, and (B) 25-85 parts by weight of a crosslinked elastomer of an ethylene/alkyl acrylate copolymer consisting essentially of units derived from etylene, an alkyl ester of acrylic acid wherein the alkyl group contains 1-6 carbon atoms, and a monoalkyl ester of 1,4-butenedioic acid wherein the alkyl group contains 1-6 carbon atoms forming the discontinuous phase of the composition.

The melt processible multi-phase thermoplastic composition can be prepared by mixing and shearing the elastomeric uncrosslinked ethylene/alkyl acrylate copolymer with the crystalline polyolefin resin and a crosslinking agent for the copolymer, preferably in a high shear mixer, and carrying out crosslinking of the ethylene/alkyl acrylate copolymer simultaneously with the mixing operation. Alternatively, the ethylene/alkyl acrylate copolymer can be crosslinked alone, then finely divided into a powder, and the powder mixed with the molten polyolefin resin. In order for the compositions to process well as thermoplastics, the crosslinked ethylene/alkyl acrylate copolymer component must be dispersed in the thermoplastic polyolefin resin as the discontinuous phase.

More specifically, a preferred process for making a melt processible multi-phase thermoplastic composition comprising a blend of a crystalline polyolefin and an elastomer comprises:

(1) adding to a mixer (A) 15-75 parts by weight of the crystalline polyolefin resin, polyethylene, polypropylene or copolymers thereof, and (B) 25-85 parts by weight of an uncrosslinked ethylene/alkyl acrylate copolymer elastomer consisting essentially of ethylene, an alkyl ester of acrylic acid wherein the alkyl group contains 1-6 carbon atoms and a monoalkyl ester of 1,4-butenedioic acid wherein the alkyl group contains 1-6 carbon atoms, and (C) a crosslinking agent for the ethylene/alkyl acrylate elastomer, and (2) mixing and shearing the composition at a temperature sufficient to soften the polyolefin resin and to crosslink and comminute said elastomer resulting in the crosslinked elastomer being dispersed as the discontinuous phase throughout the crystalline polyolefin resin.

The melt processible multi-phase thermoplastic compositions can be formed into various shapes by compression molding, injection molding, blow molding and extrusion. The compositions can be used for automotive parts, e.g. automotive boots, seals, gaskets, tubing, reinforced hose, film and sheeting.

DESCRIPTION OF PREFERRED EMBODIMENTS

The crystalline polyolefin resin used in the present invention is polyethylene, polypropylene or copolymers thereof and is added to and is present in the composition in amounts of from about 15-75 parts by weight, preferably, 25-70 parts by weight. The terms "polyethylene" and "polypropylene" as used herein are intended to include in addition to the homopolymers those polymers that also contain minor amounts, usually not greater than 15 weight percent, of higher $\alpha$-olefins, e.g., those containing 3-8 carbon atoms, e.g., butene, octene etc. The polyethylene and the polypropylene polymers used in this invention have melt indices in the range of from about 0.07-80 dg/min.

The melt processible thermoplastic compositions also contains 25-85 parts by weight, preferably 30-75 parts by weight, of an elastomeric ethylene/alkyl acrylate copolymer. The ethylene/alkyl acrylate copolymer is an elastomer and comprises ethylene, an alkyl ester of acrylic acid wherein the alkyl group contains 1-6 carbon atoms and a monoalkyl ester of 1,4-butenedioic acid. The monoalkyl ester of 1,4-butenedioic acid functions as a cure-site monomer. The ethylene/alkyl acrylate copolymer contains 20-75 weight percent alkyl acrylate units, preferably 40-65 weight percent; and 0.5-20 weight percent, preferably 1-10 weight percent, units of a monoalkyl ester of 1,4-butenedioic acid. The alkyl acrylates used in the ethylene/alkyl acrylate copolymers can be methyl acrylate, ethyl acrylate, propyl acrylate, butyl acrylate, pentyl acrylate and hexyl acrylate. Preferably, methyl acrylate is used. The monoalkyl esters of 1,4-butenedioic acid that can be used in the ethylene/alkyl acrylate copolymer generally contain 1-6 carbon atoms in the alkyl group. Since butenedioic acids exist in the cis and trans form, i.e., maleic and fumaric acids, the monoalkyl esters of either the cis or trans form are satisfactory. Representative monoalkyl esters of 1,4-butenedioic acid that are preferred are monoethyl hydrogen maleate, monomethyl hydrogen maleate and monopropyl hydrogen maleate, and monoethyl hydrogen maleate is especially preferred.

The ethylene/alkyl acrylate copolymers used in the compositions of the present invention can be prepared by direct copolymerization, for example, copolymerizing ethylene, an alkyl acrylate, and a monoalkyl ester of 1,4-butenedioic acid in the presence of a free-radical polymerization initiator at elevated temperatures, preferably 100°–270° C., and most preferably 130°–230° C., and at elevated pressures, preferably at least 70 MPa, and most preferably 140–350 MPa. The most preferred ethylene/alkyl acrylate copolymers that are used in the invention are copolymers of ethylene, methyl acrylate and monoethyl hydrogen maleate.

An important feature of the present invention is the necessity of crosslinking the elastomeric ethylene/alkyl acrylate copolymer component of the composition. Crosslinking is carried out using one or more of the well known crosslinking agents for ethylene/alkyl acrylate copolymers. Typical crosslinking agents for the ethylene/alkyl acrylate copolymers described herein include diamines or polyamines or precursors thereof such as methylenedianiline; 1,6-hexanediamine or its carbamate; meta-xylene-$\alpha,\alpha'$-diamine; 2-methyl-1,5-diamino-pentane; triethylenetetramine; diethylenetriamine; bis(para-aminocyclohexyl)methane; and ethylene diamine. The amount of crosslinking agent used will vary over a wide range. Usually the amount of crosslinking agent used will result in a gel content of at least about 50% by weight of the ethylene/alkyl acrylate copolymer. Typically, such amounts of crosslinking agents range from about 0.1–5 parts by weight, usually 0.1–2 parts by weight, of the ethylene/alkyl acrylate elastomer. Although the amount of crosslinking agent used can be more than 5 parts by weight, there is no advantage in using larger amounts. As is the usual practice when curing ethylene/alkyl acrylate copolymers, optionally conventional promotors such as di-ortho-tolylguanidine, diphenylguanidine or the like can be used. To quantify the degree of crosslinking the amount of insoluble, and hence crosslinked polymer is determined by leaching the sample of the crosslinked polymer at a temperature at which the polymer before crosslinking will dissolve in toluene, in the same toluene solvent for 48 hours, isolating the insoluble portion and weighing the dried polymer, making suitable corrections based upon knowledge of the composition. For example, the weight of additives soluble in toluene such as processing oils are subtracted from the initial weight. The weight of insoluble additives such as pigments fillers, etc., are subtracted from the initial and final weight. The portion of the crystalline polyolefin resin which is insoluble in toluene is subtracted from the final weight. The insoluble polymer recovered after the required correction is reported as percent by weight gel content. The crosslinked ethylene/alkyl acrylate copolymers usually have gel contents of at least about 50% by weight, preferably at least about 65% by weight. Conditions under which crosslinking is carried out, i.e., type and quantity of crosslinking agent, and crosslinking time and temperature, to arrive at a polymer having a gel content mentioned above can be determined empirically and is well known in the art of making ethylene/alkyl acrylate copolymers. The ethylene/alkyl acrylate copolymers can be crosslinked prior to mixing. However, such procedure is not preferred because it is necessary to pulverize or powder the crosslinked copolymers before mixing with the crystalline polyolefin. In this instance, no further crosslinking is required during mixing. The high shear mixers mentioned above can be conveniently used to mix the elastomer in powder form with the crystalline polyolefin and other ingredients.

The multi-phase melt processible thermoplastic composition is prepared by mixing the crystalline polyolefin resin, the uncrosslinked ethylene/alkyl acrylate elastomer and crosslinking agent by any one of a number of well known procedures for mixing elastomers, for example, in a Banbury mixer, on a two-roll mixer or in an extruder. The mixing is performed at a temperature high enough to soften the polymers for adequate mixing, but not so high as to degrade the polymers. Generally, mixing is performed at temperatures of from about 100°–280° C., usually about 125 –230° C. Preferably, crosslinking is conducted during mixing and shearing. Mixing and shearing are carried out for a time sufficient to allow for crosslinking the ethylene/alkyl acrylate elastomer and for comminuting the crosslinked elastomeric copolymer resulting in the elastomer being dispersed throughout the crystalline polyolefin resin as the discontinuous phase and the polyolefin resin forming the continuous phase of the thermoplastic composition. Adequacy of mixing can be determined by observing the processibility of the compositions by means of a piston rheometer. If the degree of mixing is inadequate, as indicated by poor extrudability at processing temperatures, additional mixing at the original mixing temperature or at lower temperatures can be employed to further comminute and disperse the resultant crosslinked ethylene/alkyl acrylate elastomer in the crystalline polyolefin resin so as to obtain satisfactory thermoplastic processibility.

Although not essential components of the thermoplastic composition of this invention, preferably, especially from a cost standpoint, various amounts of conventional fillers or compounding ingredients normally used with elastomers may be admixed with the compositions of this invention. Examples of such ingredients include extending oils, e.g. aromatic oils, paraffinic oils or naphthenic oils; inorganic fillers, such as various carbon blacks, clays, silica, alumina, calcium carbonate; pigments, such as titanium dioxide; antioxidants; antidegradants; processing aids such as lubricants and waxes; and plasticizers such as dialkylphthalates and trialkylmellitates. It is preferable to add processing oils and inorganic fillers to the thermoplastic composition to improve its processing characteristics and the particular amounts used depend, at least in part, upon the quantities of other ingredients in the composition and the desired properties of the composition.

The melt processible multi-phase thermoplastic compositions of the subject invention can be processed using conventional plastic processing equipment. Articles molded from the thermoplastic compositions of the present invention exhibit properties generally only associated with vulcanized rubber. For example, compositions of the present invention usually have tensile strength values of about 3–20 MPa and elongation at break values of about 75 to 350%. Various uses for the thermoplastic elastomer compositions include wire coverings, seals and gaskets, automotive parts, sheet liners and packaging films. Further, melt processible thermoplastic compositions within the scope of this invention can be fabricated into tubing for laboratory, medical and industrial uses. Such tubing can also be used as the inner tube of reinforced hoses, wherein the extruded tube is overlaid with wire or textile cords, applied as a spiral, knit or braid. Optionally, a polymeric covering can be applied (extruded, spiral wound or calendered sheet) over the reinforced tubing to provide protection from the working environment and mechanical abuse. Compositions within the scope of this invention can be used as the protective covering of reinforced tubes of similar or different composition.

EXAMPLES

General Procedure Used to Prepare Thermoplastic Compositions

The polymers to be mixed were charged to a Haake Rheocord Model 600 mixer equipped with cam-style blades and modified to allow a flow of nitrogen gas to blanket the mixing chamber. Before charging the polymers, the mixing chamber was preheated to the mixing temperatures given in the examples. The initial polymer composition for each example described below was mixed in the Haake mixer until the temperature of the mixing chamber recovered to the preheat temperature. Mixing times given in the working examples were measured from that time forward. During preparation of the thermoplastic compositions, the temperature of the mixtures usually rose above the preset temperature of the mixing chamber. Specific details of the mixing procedures are described in the examples.

Polymer Test Methods

Test specimens were cut from slabs compression molded at the temperatures specified in the examples to determine physical properties. The test methods used were:

tensile strength at break at 8.5 mm/s: ASTM D412
elongation at break at 8.5 mm/s: ASTM D412
compression set after 22 hr/70° C., method B: ASTM D395
volume swell in ASTM #3 oil: ASTM D471

Stress-strain measurements were run on test specimens approximately 0.6 mm in thickness. Stress-strain measurements were run using nonstandard dumbbells having the following dimensions using the standard dumbbell nomenclature of ASTM D412:

A=13 mm, C=83 mm, L=44 mm, W=6.4 mm.
Compression sets were measured using 13 mm diameter discs died out of about 2 mm thick slabs and piled up to a thickness of about 13 mm. Specimens used for the oil swell tests were cut from 1.9 mm thick-slabs which were remolded from previously molded slabs in order to demonstrate the remoldability of the blends. All tests were run in duplicate or triplicate.

Polymers Employed

The polypropylene employed in the working examples hereinbelow is an isotactic homopolymer having melt flow rate (ASTM D1238) at 230° C. of 0.8 dg/min and a density of 0.9 g/cm$^3$. The polyethylene employed is a homopolymer having a melt index of 2.9 dg/min and a density of 0.958 g/cm$^3$.

The ethylene/alkyl acrylate elastomer employed contains, by weight, 41% ethylene/54% methyl acrylate/4.5% monoethyl ester of maleic acid.

The following examples, in which parts are by weight, unless otherwise indicated, are illustrative of the present invention and show the advantages resulting therefrom.

EXAMPLE 1

Two series of compositions were prepared from polyethylene homopolymer and ethylene/alkyl acrylate elastomer. One series was prepared with no added crosslinking agents and the other series with crosslinking agents present to crosslink the ethylene/alkyl acrylate elastomer. The series with crosslinking agents present was prepared by mixing the polyethylene in the Haake mixer for four minutes after the temperature recovered to 180° C., adding the ethylene/alkyl acrylate elastomer and mixing for 8 minutes, adding 1.8 parts of the crosslinking agent hexamethylenediamine carbamate and 6 parts of di-ortho-tolylguanidine per 100 parts of total polymer and mixing and shearing for 10 minutes to dynamically cure the elastomer, the resulting composition is removed from the Haake mixer, and then reinserted in the Haake mixer at 180° C. and mixed for an additional 2 minutes. The series without added crosslinking agents present was prepared by mixing the polyethylene in the Haake mixer for four minutes after the temperature recovered to 180° C., adding the ethylene-/alkyl acrylate elastomer and mixing for 18 minutes, removing the mixture from the Haake mixer, and then reinserting the mixtures in the Haake mixer at 180° C. and mixing for an additional 2 minutes. The relative proportions of the polymers in the various compositions and the properties of the compositions after compression molding at 220° C. are listed in Table 1. Compositions 1C to 6C were prepared with crosslinking agents present and compositions 1N to 6N were prepared without crosslinking agents present.

Compositions 1C to 6C are illustrative of the present invention. Compositions 1N to 6N are shown for comparison purposes only. Compositions 1C to 6C excel relative to compositions 1N to 6N having similar polymer proportions with regard to tensile strength, resistance to compression set, and resistance to oil swell upon immersion.

TABLE 1

| Composition | Polyethylene (wt %) | Ethylene/Alkyl Acrylate Elastomer (wt %) | Tensile Strength (MPa) | Elongation at Break (%) | Comp. Set at 70° C. (%) | Oil swell 7 days at 70° C. (% vol. swell) |
|---|---|---|---|---|---|---|
| 1C | 70 | 30 | 14 | 100 | 62 | 15 |
| 1N | 70 | 30 | 10 | 95 | 77 | 16 |
| 2C | 60 | 40 | 12 | 100 | 62 | 15 |
| 2N | 60 | 40 | 9.9 | 40 | 78 | 23 |
| 3C | 50 | 50 | 12 | 215 | 53 | 23 |
| 3N | 50 | 50 | 6.4 | 60 | 94 | Melted |
| 4C | 40 | 60 | 11 | 215 | 36 | 28 |
| 4N | 40 | 60 | 0.1 | 100 | 100+ | 42 |
| 5C | 30 | 70 | 11 | 245 | 22 | 34 |
| 5N | 30 | 70 | 0.1 | 990 | 100+ | Melted |
| 6C | 20 | 80 | 6.0 | 195 | 9 | 41 |

TABLE 1-continued

| Composition | Polyethylene (wt %) | Ethylene/Alkyl Acrylate Elastomer (wt %) | Tensile Strength (MPa) | Elongation at Break (%) | Comp. Set at 70° C. (%) | Oil swell 7 days at 70° C. (% vol. swell) |
| --- | --- | --- | --- | --- | --- | --- |
| 6N | 20 | 80 | 0.1 | 105 | Melted | Melted |

EXAMPLE 2

Two series of compositions were prepared from polypropylene homopolymer and ethylene/alkyl acrylate elastomer. One series was prepared with no added crosslinking agents and the other series with crosslinking agents present to crosslink the ethylene/alkyl acrylate elastomer. The two series of compositions were prepared as described in Example 1, with the same ingredients, except that polypropylene was used in place of polyethylene. The relative proportions of the polymers in the various compositions and the properties of the compositions after compression molding at 220° C. are listed in Table 2. Compositions 7C to 12C were prepared with crosslinking agents present and compositions 7N to 12N without crosslinking agents present.

Compositions 7C to 12C are illustrative of the present invention. Compositions 7N to 12N are shown for comparison purposes only. Compositions 7C to 12C excel relative to compositions 7N to 12N of similar polymer proportions with regard to resistance to swell upon oil immersion, are equivalent or better in resistance to compression set, and are substantially equivalent or superior in tensile strength.

The relative proportions of the components and the properties of the two compositions after compression molding at 220° C. are shown in Table 3. The results of this example demonstrate that the invention can be carried out in the presence of filler and oil additives.

TABLE 3

|  | 13C | 14C |
| --- | --- | --- |
| Composition (parts by weight) | | |
| polypropylene | 35 | 35 |
| ethylene/alkyl acrylate elastomer 65 | 65 | |
| SRF-NS carbon black ASTM N744 | 30 | |
| aromatic oil ASTM D2226 type 102 | 15 | |
| hexamethylenediamine carbamate | 1.8 | 1.8 |
| 1,3-di-ortho-tolylguanidine | 6.1 | 6 |
| Properties | | |
| tensile strength, MPa | 9.9 | 8.9 |
| elongation at break, % | 170 | 170 |
| compression set, % | 38 | 42 |

I claim:

1. A melt processible multi-phase thermoplastic composition consisting essentially of a blend of:
   (A) 15–75 parts by weight of a crystalline polyolefin resin comprising polymerized monomer units of

TABLE 2

| Composition | Polypropylene (wt %) | Ethylene/Alkyl Acrylate Elastomer (wt %) | Tensile Strength (MPa) | Elongation at Break (%) | Comp. Set at 70° C. (%) | Oil swell 7 days at 70° C. (% vol. swell) |
| --- | --- | --- | --- | --- | --- | --- |
| 7C | 70 | 30 | 15 | 95 | 75 | 27 |
| 7N | 70 | 30 | 16 | 55 | 78 | (a) |
| 8C | 60 | 40 | 12 | 100 | 72 | 33 |
| 8N | 60 | 40 | 9.4 | 35 | 87 | (a) |
| 9C | 50 | 50 | 10 | 140 | 88 | 38 |
| 9N | 50 | 50 | 4.2 | 75 | 88 | (a) |
| 10C | 40 | 60 | 9.0 | 97 | 54 | 42 |
| 10N | 40 | 60 | 2.9 | 45 | 100 | (a) |
| 11C | 30 | 70 | 7.0 | 130 | 39 | 48 |
| 11N | 30 | 70 | 1.2 | 60 | 100 | (a) |
| 12C | 20 | 80 | 3.1 | 80 | 18 | 54 |
| 12N | 20 | 80 | 0.1 | 475 | 100 | Melted |

(a) Samples too sticky to measure volume swell at end of oil swell test.

EXAMPLE 3

A composition was prepared from polypropylene, ethylene/alkyl acrylate elastomer, carbon black, aromatic oil, and crosslinking agents for the ethylene/alkyl acrylate elastomer. The composition was prepared by mixing polypropylene in the Haake mixer for four minutes after the temperature recovered to 180° C., adding ethylene/alkyl acrylate elastomer and mixing for 8 minutes, adding carbon black and oil and mixing for four minutes, adding the crosslinking agent hexamethylenediamine carbamate and di-ortho-tolylguanidine and mixing and shearing for 10 minutes to dynamically cure the elastomer. The resulting composition is mixed on a hot (180° C.) 2-roll mill for about 3 minutes, and then remixed in the Haake mixer for 2 minutes at about 180° C. A similar composition was prepared without added carbon black and oil according to the procedure described in Example 1, except that polypropylene was used in place of polyethylene.

ethylene or propylene or mixtures thereof forming the continuous phase of the composition, and
   (B) 25–85 parts by weight of a dynamically crosslinked elastomer of an ethylene/alkyl acrylate copolymr said elastomer crosslinked by an agent selected from the group consisting of a diamine, a polyamine, or precursors thereof, said elastomer consists essentially of units derived from ethylene, an alkyl ester of acrylic acid wherein the alkyl group contains 1∝6 carbon atoms, and a monoalkyl ester of 1,4-butenedioic acid wherein the alkyl group contains 1–6 carbon atoms forming the discontinuous phase of the composition.

2. A melt processible thermoplastic composition of claim 1 wherein the crosslinked elastomer is a copolymer of units derived from ethylene, methyl acrylate and the monoethyl ester of maleic acid.

3. A melt processible thermoplastic composition of claim 1 wherein the crystalline polyolefin resin comprises polymerized monomer units of ethylene.

4. A melt processible thermoplastic composition of claim 1 wherein the crystalline polyolefin resin comprises polymerized monomer units of propylene.

5. A melt processible thermoplastic composition of claim 1 containing an inorganic filler.

6. A melt processible thermoplastic composition of claim 1 containing carbon black.

7. A melt processible thermoplastic composition of claim 1 containing a hydrocarbon oil.

8. A melt processible multi-phase thermoplastic composition consisting essentially of a blend of a crystalline polyolefin resin and an elastomer which comprises:
(a) 20-70 parts by weight of a crystalline polyolefin resin comprising polymerized monomer units of ethylene or propylene forming the continuous phase of the composition, and
(b) 30-80 parts by weight of a dynamically crosslinked elastomer of an ethylene/alkyl acrylate copolymer said elastomer is crosslinked by an agent selected from the group consisting of a diamine, a polyamine, or precursors thereof, said elastomer consists essentially of units derived from ethylene, methyl acrylate and the monoalkyl ester of 1,4-butenedioic acid wherein the alkyl group contains 1-6 carbon atoms forming the discontinuous phase of the composition.

9. A melt processible thermoplastic composition of claim 8 wherein the crosslinked elastomer consists essentially of units derived from ethylene, methyl acrylate and the monoethyl ester of meleic acid.

10. A process for making melt processible multi-phase thermoplastic composition consisting essentially of a blend of a crystalline polyolefin resin and an elastomer which comprises:
(1) adding to a mixer
(A) 15-75 parts by weight of the crystalline polyolefin resins polyethylene, or polypropylene or copolymers thereof, and
(B) 25-85 parts by weight of an uncrosslinked ethylene/alkyl acrylate copolymr elastomer consisting essentially of ethylene, an alkyl ester of acrylic acid wherein the alkyl group contains 1-6 carbon atoms and a monalkyl ester of 1,4-butenedioic acid wherein the alkyl group contains 1-6 carbon atoms, and
(C) a crosslinking agent for the ethylene/alkyl acrylate elastomer that is a diamine, a polyamine, or precursors thereof, and
(2) mixing and shearing the composition at a temperature sufficient to soften the polyolefin resin and to crosslink and comminute said elastomer resulting in the crosslinked elastomer being dispersed as the discontinuous phase throughout the crystalline polyolefin resin.

11. A process for making a melt processible thermoplastic composition of claim 10 which commprises adding to the mixer the uncured ethylene/alkyl acrylate elastomer derived from ethylene, methyl acrylate and the monoalkyl ester of maleic acid.

12. A process for making a melt processible thermoplastic composition of claim 10 which comprises adding to the mixer the crystalline polyolefin resin polyethylene.

13. A process for making a melt processible thermoplastic composition of claim 10 which comprises adding to the mixer the crystalline polyolefin resin polypropylene.

14. A process for making a melt processible thermoplastic composition of claim 10 which comprises adding to the mixer an inorganic filler.

15. A process for making a melt processible thermoplastic composition of claim 10 which comprises adding to the mixer a hydrocarbon oil.

16. A process for making a melt processible thermoplastic composition consisting essesntially of a blend of a crystalline polyolefin resin and an elastomer which comprises:
(1) adding to a mixer
(A) 25-70 parts by weight of the crystalline polyolefin resin polyethylene, or polypropylene, and
(B) 30-75 parts by weight of an uncured elastomer of an ethylene/alkyl acrylate copolymer that consists essentially of polymerized units of ethylene, methyl acrylate and the monolkyl ester of 1,4-butenedioic acid wherein the alkyl group contains 1-6 carbon atoms, and
(C) a crosslinking agent for the ethylene/alkyl acrylate elastomer that is a diamine, a polyamine, or precursors thereof, and
(2) mixing and shearing the composition at a temperature sufficient to soften the polyolefin resin and elastomer and to crosslink and comminute said elastomer resulting in the crosslinked elastomer being dispersed as the discontinuous phase throughout the continuous phase of the crystalline polyolefin.

* * * * *